Patented Oct. 31, 1950

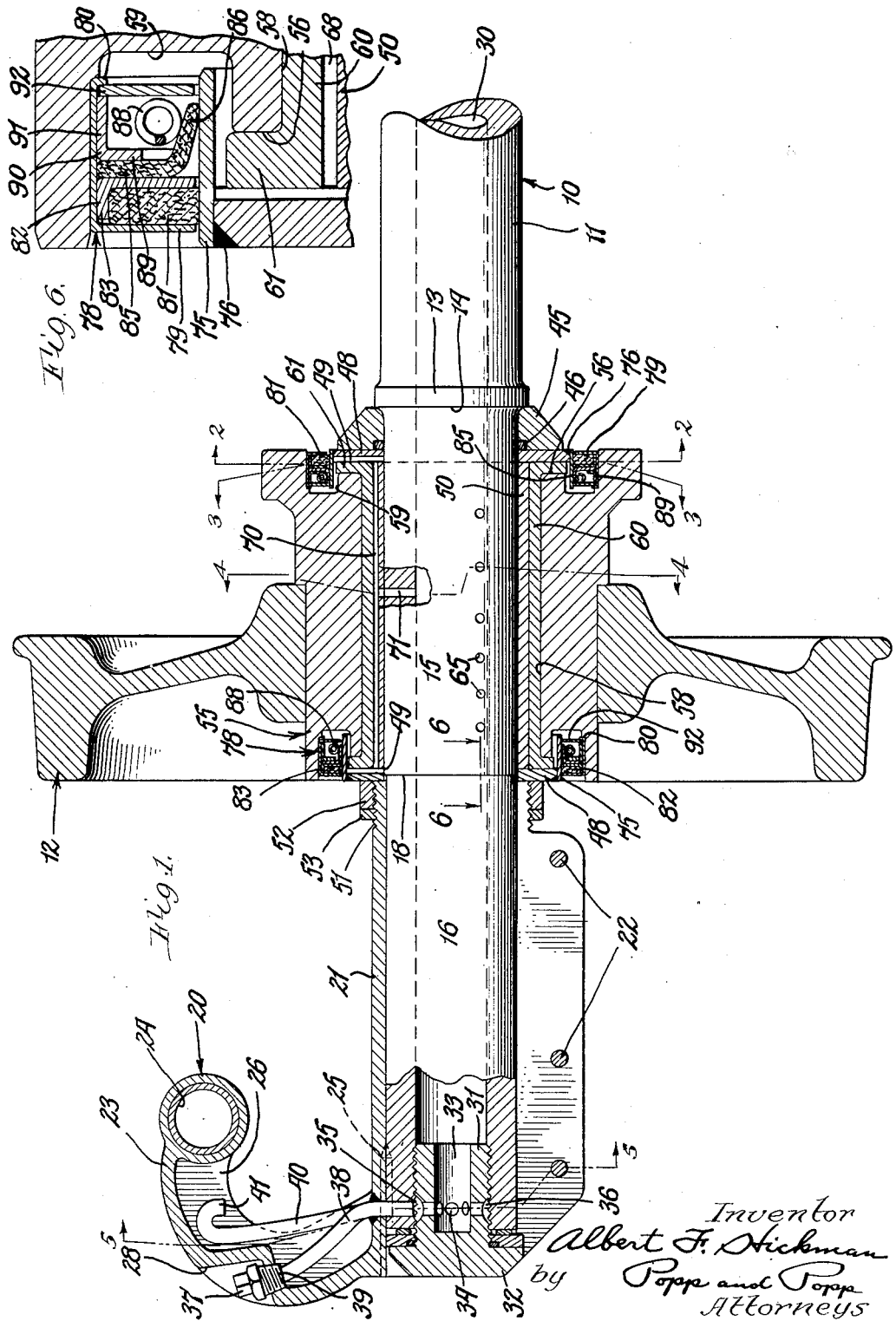
Oct. 31, 1950     A. F. HICKMAN     2,527,551
FRICTIONAL BEARING ASSEMBLY
Filed June 5, 1946     2 Sheets-Sheet 1
Inventor
Albert F. Hickman
by Popp and Popp
Attorneys

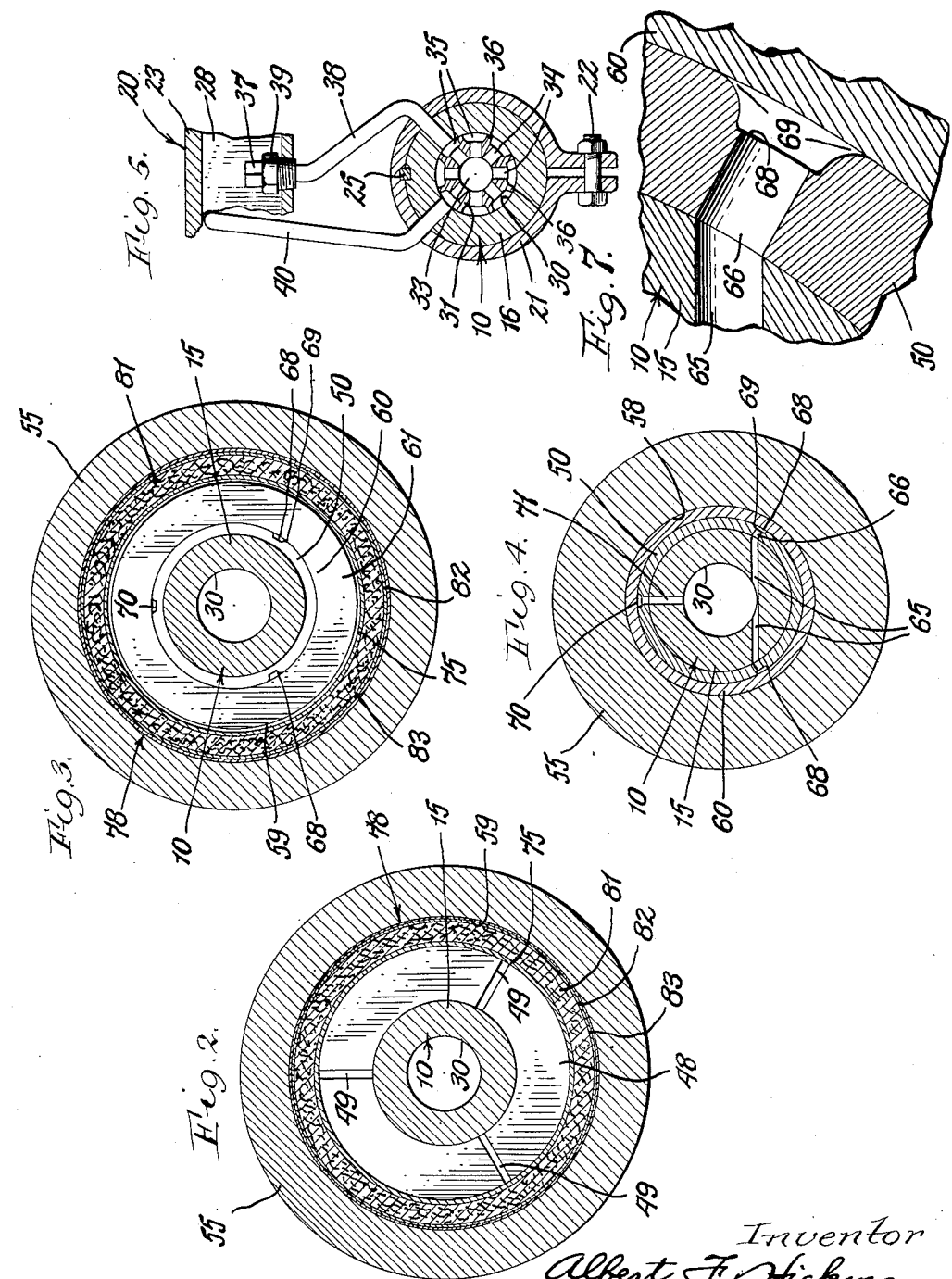

2,527,551

UNITED STATES PATENT OFFICE 2,527,551

FRICTIONAL BEARING ASSEMBLY

Albert F. Hickman, Eden, N. Y., assignor to Hickman Pneumatic Seat Co. Inc., Eden, N. Y., a corporation of New York Application June 5, 1946, Serial No. 674,489

4 Claims. (Cl. 308—103)

This invention relates to a high speed friction bearing assembly and more particularly to an axle and wheel assembly for high speed railroad cars having a non-rotating axle supported on independently rotating railroad car wheels.

Present developments in railroad truck design indicate the increasing importance of non-rotating axles with their wheels free to rotate independently of each other in obtaining the ultimate possibilities in safety, stability, economy, riding qualities, and quietness. Thus with a non-rotating axle the axle can be stressed more than twice as high as is possible with a rotating axle, this permitting much lighter axles to be used where they are held against rotation. Also free or loose wheels on non-rotating axles reduce truck driving, draw bar pull and wheel flange wear. Further non-rotating axles provide a stationary structure to which an axle bracket can be fixed and this axle bracket can be connected to the truck frame in such manner as to yieldingly support the load and also eliminate the side sway problem and its contributing factors. The use of a non-rotating axle also lends for simple, light and effective brake mechanism.

It has also been found desirable to use friction bearings with such independently rotating railroad car wheels provided the normal disadvantages of friction bearings for such use could be overcome. Thus the cost of friction bearings particularly those embodying the present invention, is very materially less than anti-friction bearings for the same duty. Further the advantages of friction bearings, when properly lubricated, in bearing life, accuracy, freedom from destructive forces and maintenance problems is well known.

It is accordingly an important object of the present invention to provide a non-rotating axle and loose wheel assembly for high speed railroad cars having a friction bearing between the wheel and axle, which friction bearing has the advantages of a friction bearing without the normal disadvantages of a friction bearing for such use.

Another object is to provide such a bearing which is low in cost, particularly as compared with anti-friction bearings.

Another object is to provide such a friction bearing which is applicable for use with the suspension shown in my copending application Serial No. 618,917, filed September 27, 1945, for Spring Suspension for Railroad Cars.

Another object is to provide such a bearing in which the axle floats on a constantly replenished film of oil so that there is no possibility of metal to metal contact of the bearing surfaces as long as a supply of oil is maintained.

Another object is to provide a reservoir for maintaining an adequate quantity of oil to insure such supply being maintained.

Another object is to provide an adequate oil seal to prevent the escape of oil from the bearing and reservoir.

Another object is to provide an adequate dust seal to insure the proper operation of the oil seal and which will function properly as long as no substantial bearing wear takes place.

Another aim is to insure adequate lubrication of the thrust bearings of the car wheel.

Another object is to provide such a bearing which is readily accessible for inspection, repair and replacement.

Another aim is to provide for the free circulation and cooling of the oil supplied to the bearing areas.

Another purpose is to provide for the escape and venting of air or gases carried into the film between the bearing surfaces.

Another object is to provide such a bearing which is free from destructive forces in the event of bearing failure.

Another object is to provide such a bearing which is free from the danger of derailment in the event of bearing failure.

Other objects and advantages of the invention will appear from the following description and drawings in which:

Fig. 1 is a vertical longitudinal section, partly in elevation, of a non-rotating railroad car axle supported on a railroad car wheel by a friction bearing in accordance with my invention.

Figs. 2–5 are vertical cross sectional views taken on the correspondingly numbered lines of Fig. 1.

Fig. 6 is a fragmentary enlarged section, taken on line 6—6, Fig. 1.

Fig. 7 is a greatly enlarged section, similar to Fig. 4 and particularly showing the cross sectional shape of the oil grooves 68.

The non-rotating railroad car axle, indicated generally at 10, and which in other installations would be a non-rotating shaft, is shown as having a central enlarged part 11 between the flanged car wheels 12 and as having an enlarged annular rim 13 immediately inside of each wheel 12 which forms an outwardly facing shoulder 14; a reduced cylindrical load bearing portion 15 extending outwardly from this shoulder and which is supported directly by the wheel 12 and a reduced cylindrical extremity 16, an outwardly facing annular shoulder 18 being provided between the reduced extremity 16 and the bearing portion 15 of the axle.

The axle is designed to be connected with the truck or car frame (not shown) by the spring suspension forming the subject of my said copending patent application Serial No. 618,917, filed September 27, 1945, for Spring suspension for railroad cars, and to this end is shown as having an axle bracket 20 secured to each projecting end of the axle and having a split tubular base or clamping portion 21 which embraces the reduced extremity 16 of the axle. The split of this base or clamping portion 21 of each axle bracket is shown as extending upwardly from its bottom lengthwise of the axle, and the sides of the split are shown as drawn together by a plurality of bolts 22 so as to firmly clamp the extremity 16 of the axle therebetween. The extending part of the axle bracket is in the form of a channeled gooseneck 23, this extending part extending outwardly and upwardly from the axle and its extreme upper end curving inwardly and downwardly and carrying a bearing 24 for an axle pivot pin (not shown) which is journalled at its extreme depressed end. The details of the spring suspension beyond the axle bracket 20 form no part of the present invention and hence are not shown, reference being made to my said copending patent application for a detailed description thereof.

The axle bracket 20 is shown as keyed to the axle, as indicated at 25 and its channel 26 is shown as facing inwardly or toward the car wheel 12 for a purpose which will presently appear. The axle bracket is also shown as having an indentation or recess 28 in the outer face of its web.

The axle forms a reservoir for a body of oil supplied to the friction bearings of the car wheels 12 and to this end is provided with a bore 30 extending axially therethrough. The opposite ends of this bore 30 are threaded to receive a plug enclosing the reservoir and one or both ends of the axle can be closed by the plug shown having a tubular stem 31 and a head 32 to which a wrench can be applied in tightening or removing the plug. The bore 33 in the stem 31 of this plug is open at its inner end to the axle bore or reservoir 30 and at its outer end this bore 33 is connected by an annular series of holes 34 with an annular series of ports 35 around the exterior of the plug stem 31. These ports 35 are of oblong shape and separated from one another by ridges or dams 36 which extend lengthwise of the axle, as best shown in Fig. 5.

The axle reservoir 30 is filled with oil and is also vented through those holes 34 and ports 35 in the plug stem 31. For filling the axle reservoir with oil, a filling tube 38 extends through the axle 10 and base 21 of the axle bracket 20 on one side of the key 25, as best shown in Fig. 5, and communicates with one of the ports 35 of the plug stem 31. The outer end of this tube is secured to a screw fitting 39 which extends through the bottom wall of the recess or indentation 28 of the axle bracket 20 and is provided with a screw plug or other suitable fitting 37 through which oil can be supplied through the filling tube 38, port 35, hole 34 and bore 33 of the plug stem 31 to the axle reservoir or bore 30.

For venting the axle reservoir 30, a vent tube 40 extends through the axle 10 and base 21 of the axle bracket 20 on the other side of the key 25 from the filling tube 38, as best shown in Fig. 5, and communicates with one of the ports 35 of the plug stem 31. The outer end of this vent tube 40, as best shown in Fig. 1, is in the form of a gooseneck 41 housed within the channel 26 of the axle bracket 21 and open to the atmosphere. It will be seen that by the provision of the dams or ridges 36 which form the annular series of ports 35, there is no interference between the filling and venting operations. Thus the oil flows through its port 35 and hole 34 into the bore 33 of the plug 32 without interference from the air being displaced which vents through its separate hole 34 and port 35 to the vent tube 40. It will also be seen that the housing of the upper end of the vent tube in the channel 26 of the axle bracket 20 protects it against the entrance of dust and dirt. It will further be seen that by arranging the upper ends of the filling and vent tubes 38 and 40 in the axle bracket 20 at a high elevation there is no danger of loss of oil from the axle reservoir 30 if the railroad car should stand, for example, on a steeply banked track.

A thrust collar or ring 45 is tightly fitted on the load bearing cylindrical part 15 of the axle and against the shoulder 14 formed by the annular rim 13 and this thrust collar or ring 45 has a flat thrust face opposing the car wheel 12 and arranged in a plane perpendicular to the axis of the axle. At the inner margin of this flat thrust face an annular recess is provided which surrounds the axle and receives a packing ring 46 to prevent oil leakage between the thrust ring 45 and the axle. Against the flat thrust face of the thrust ring 45 is fitted a flat sided thrust disk 48 which fits around the load bearing cylindrical part 15 of the axle and is provided, on its face opposing the car wheel 12, with a plurality of radial oil grooves 49 which extend from one margin to the other, as best shown in Figs. 1 and 2. Three of such radial oil grooves are shown, one extending vertically upwardly and the other two extending downwardly and outwardly.

A cylindrical steel sleeve 50 is tightly fitted on the load bearing cylindrical part 15 of the axle against the thrust disk 48 and the opposite end of this steel sleeve is engaged by a second thrust disk 48, having similar radial oil grooves 49 opposing the car wheel 12.

To hold these non-rotating parts of the bearing in position, the inner extremity of the tubular base or clamping portion 21 of the axle bracket 20 is threaded, as indicated at 51, and on this threaded part is arranged a threaded thrust ring 52 and threaded locking ring 53. These threaded rings 52 and 53 are tightened against the adjacent thrust disk 48 thereby to hold these thrust disks 48, steel sleeve 50 and end thrust ring or collar 45 securely in engagement with the axle shoulder 14 and in engagement with one another. The non-rotating parts of the bearing are thereby secured to the axle and secured in proper position with reference to one another.

The car wheel 12 is shown as having a tubular hub 55 on which it is tightly fixed, this hub having a relatively shallow recess 56 at each end around its bore 58 and having a deeper annular recess 59 at each end around the corresponding relatively shallow annular recess 56, these recesses 56 and 59 forming enlargements of the bore 58 at each end of the hub 55.

The bearing is shown as having babbit 60 poured between the bore 58 of the hub and the steel sleeve 50 and also in the relatively shallow annular recesses 56 at opposite ends of the bore 58 thereby to provide annular thrust parts or flanges 61 at opposite ends of the babbit bearing and which engage the opposing thrust faces of the two thrust disks 48. It will therefore be seen that the babbit provides a radial friction bearing face engaging the steel sleeve 50 and also axial or thrust friction bearing faces engaging the two thrust disks 48. This babbit 60, together with its thrust flanges or ends 61 can also be made of bronze in two sections. In such event the break between the two sections should be close to the right hand end thereof, as viewed in Fig. 1, so as to be remote from the load bearing end of the bearing where high oil pressures develop.

An important feature of the present invention resides in the oiling of the friction bearing as above described. For this purpose the cylindrical bearing portion 15 of the axle is provided with a series of holes or ducts 65 which are shown as arranged in a generally horizontal plane intersecting the lower part or bottom of the oil reservoir 30 in the axle. These holes or ducts 65 extend from the oil reservoir 30 to the exterior face of the cylindrical bearing portion 15 of the axle and each communicates with a port 66 through the steel sleeve 50. The series of the ports 66 on each side of the bearing are connected by an oil groove 68 in the inner face of the steel sleeve 50, these grooves 68 extending the full length of the steel sleeve and each communicating at its opposite ends with the corresponding radial grooves 49 of the two end thrust disks 48, as best shown in Figs. 3 and 6. Since these oil grooves 68 are in a horizontal plane generally in line with the bottom of the extremity of the axle oil reservoir 30, they are arranged a substantial distance from both the vertical plane and the horizontal plane containing the axis of the axle.

A further important feature of the invention resides in the cross sectional shape of the oil grooves 68 in the steel sleeve 50. While the bottoms and sides of these grooves can be of any form, it is important that at least the lower edge thereof be bevelled so as to each provide a V-shaped or tapering crevice 69 which points or diminishes toward the bottom of the bearing as best shown in Fig. 7. This tapering crevice can be provided by either a flat bevel or a rounding bevel, as shown, on the lower edge of each groove 68 and can be provided, as shown, on both edges of each of the grooves 68. The apex of each crevice, formed by the bevel of the groove 68 and the bore of the babbit 60, must however, be of sufficient fineness to cause a wedging or congestion of the molecules of oil therein when the babbit 60 turns on the steel sleeve 50. Since such V-shaped crevices are provided along at least the bottom edge of each groove 68 it will be seen that when the car wheel 12 is rotated in either direction oil will be wedged or crowded from the groove at the downwardly traveling side of the babbit 60 between this babbit and the steel sleeve 50, thereby to insure a film of oil at all times between the underside of the steel sleeve 50 and the babbit 60.

The steel sleeve 50 is provided with a longitudinal groove 70 at its apex, this groove extending the full length of the steel sleeve and communicating at its opposite ends with two of the radial grooves 49 of the two end thrust disks 48. This groove 70 is shown as being of the same cross sectional shape as the grooves 68 but its cross sectional shape is not important as it functions as an air and oil return groove, the air and oil collecting in this groove passing through a vertical duct 71 extending from the bottom of the groove 70 through the steel sleeve 50 and axle 10 to the axle oil reservoir 30.

A feature of the invention resides in the oil and dust seal provided at opposite ends of the bearing to prevent the escape of oil and the ingress of dust and other foreign matter. As best shown in Fig. 6, a cylindrical ring 75 of uniform wall thickness and which can be made of steel is fitted over each thrust disk 48 so as to have its outer edge coplanar with the outer vertical face of the disk 48 and its opposite end projecting into the deep annular recess 59 formed in the corresponding end of the hub 55 of the car wheel 12. Each cylindrical ring is welded to its supporting thrust disk 48 around its outer edge, as indicated at 76.

A sheet steel retaining ring 78 is also fitted in the deep annular recess 59, this retaining ring having a cylindrical web fitting the outer cylindrical wall of this recess, an outer radially inwardly projecting flange 79 which terminates close to the periphery of the cylindrical ring 75 near its outer end and an inner radially inwardly projecting flange 80 which is fitted against an annular shoulder provided in the inner end of the deep annular recess 59.

Arranged against the outer flange 79 of the sheet metal retaining ring 78, and in contact with the periphery of the cylindrical ring 75 is a felt ring 81, this felt ring being backed by a cup-shaped metal ring 82 having its rim or outer flange 83 fitted between the web of the sheet metal retaining ring 78 and the periphery of the felt washer 81. The inner rim of this cup-shaped metal ring 82 is spaced from the cylindrical ring 75. A leather ring 85 has its outer part fitted against the inner face of the cup-shaped ring 82 and the sheet metal retaining ring and the inner part of this leather ring is apertured to fit the cylindrical retaining ring and is flexed inwardly to provide a generally horizontal tubular extension 86. This generally horizontal tubular extension 86 of the leather ring 85 is pressed against the periphery of the cylindrical ring 75 by a helical garter spring 88 embracing the same. The outer end of the leather ring 85 is held against the cup-shaped metal ring 82 by the inwardly projecting flange 89 of a second cup-shaped ring 90, the rim or outer flange 91 of which is fitted in the sheet metal retaining ring. This last cup-shaped metal ring 90 and the garter spring 88 are retained in position by a flat washer-like ring 92 which loosely fits around the inner extremity of the cylindrical ring 75 and the outer edge of which is tightly fitted between the rim 91 of the second cup-shaped metal ring 90 and the inner flange 81 of the sheet metal retaining ring 78.

In the operation of the bearing, it will be seen that the split base or tubular support 21 for the axle bracket 20 holds the bearing parts and car wheel 12 in proper position. Thus the screw ring or nut 52 on the threads 51 of this split base 21 of the axle bracket holds the thrust disks 48, steel sleeve 52 and thrust collar 45 in firm engagement with one another and in firm engagement with the axle shoulder 14 thereby to hold the non-rotating radial and thrust bearing faces of the bearing in proper position to properly center the rotating parts thereof. Further the removal of the axle bracket 20 permits the ready disassembly of all of the bearing parts for purposes of inspection, repair or replacement.

When it is necessary to fill the axle reservoir 30, the plug 37 is unscrewed and oil poured into the filling tube 38, this oil passing from this tube through the right hand port 35 (as viewed in Fig. 5), hole 34 and bore 33 of the plug stem 31 into the axle reservoir 30. The air displaced by the incoming oil passes from the bore 33 of the plug stem 31 and through a left hand (as viewed in Fig. 5) hole 34 and port 35 into the vent tube 40 the gooseneck 41 of which is housed in the channel 36 of the axle bracket 20. If one end of the axle should be high, it can be filled from the high side of the axle without danger of the oil flowing out through the vent 40 on the low side of the axle, the high elevation of the gooseneck 41 insuring against such result.

The oil in the axle reservoir 30 fills the holes or ducts 65, ports 66 and oil grooves 68 on opposite sides of the axle. Assuming the car wheel 12 and its hub 55 to be rotating clockwise, as viewed in Figs. 4 and 6, it will be seen that the oil in the lower V-shaped crevice 69 of the right hand oil groove 68 is subjected to molecular congestion or wedging in the downwardly pointed or downwardly converging apex of this V-shaped crevice and hence is continuously forced or pumped between the underside of the steel sleeve 50 and the babbit 60 to provide a constantly replenished film of oil under the steel sleeve on which the axle floats. This film of oil rotates with the car wheel and since it is constantly being replenished there is no danger of metal to metal contact between the periphery of the babbit 60 and the steel sleeve 50. It will also be seen that with a reverse or counter-clockwise rotation of the car wheel 12 as viewed in Figs. 4 and 6, the opposite or left hand oil groove 68 becomes effective to provide this constant replenishment of the film of oil under the steel sleeve 50.

This oil from the two grooves 68 also flows out of the ends of these grooves into the radial grooves 49 of the thrust disks, these grooves 68 and 49 being in end communication with each other, as best shown in Figs. 2, 3 and 6. These lower radial grooves 49 of the two thrust plates thereby supply oil between the thrust bearing faces of the thrust disks 48 and the end flanges 61 of the babbit 60 as well as to supply oil to the annular chamber, provided by the deep annular recess 59, behind each oil seal at each end of the bearing.

The oil entering each annular chamber provided by the deep annular recess 59 from the radial oil grooves 49 of the thrust disks 48 is prevented from escaping by the leather ring 85, the horizontally projecting tubular port 86 of which is held in annular contact with the cylindrical ring 75 by the garter spring 88. This oil maintains the softness of the leather ring 85 and prevents friction and wear between the port 86 of the leather ring 85 and the cylindrical ring 75. The entrance of dirt and dust from the outside is prevented by the felt ring 81.

The upper groove 70 acts as a drain for any excess oil and also supplies oil to the upper oil groove 49 of each end thrust disk 48. The excess oil drains through the passage 71 back to the axle reservoir 30. This upper groove 70 also provides for the escape of such air or other gases which are forced into the oil film by the lower oil grooves 68, this air venting through the passage 71 to the upper part of the axle reservoir 30 and thence through the gooseneck vent 40 at the opposite ends of the axle.

The components of the present invention act together in a circular functional cycle to insure long life and almost carefree operation. Thus with the oil seal holding the oil against escape practically no bearing wear will occur. With practically no bearing wear the oil seal shown should function at full efficiency for at least three years of railroad service, this being the desirable period of railroad truck service before they are taken down for complete servicing and painting. With the oil seals and bearings holding up the outer dust seal member or felt ring 81 will function properly to protect the inner oil seal or leather 85 from dirt. This cycle is further maintained by the arrangement of oil grooves to insure a film of oil on which the axle floats, this film being constantly replenished by the molecular wedging or congestion created by the crevice of the oil groove 68 on the downwardly moving side of the bearing and any excess gases or oil flowing back through the passage 71 leading to the upper oil groove 70. The end thrust bearings and the annular chambers behind the oil and dust seals are also adequately supplied with oil.

For railroad use it is desirable to hold the bearing load to around 500 pounds per square inch of projected area through which the radial load passes. This insures that the bearing never runs hot enough to break down the oil film.

It should also be noted that in case of a bearing failure the axle would not be ruined in the event of bearing failure because of the protection afforded by the steel sleeve 50. Further the car wheel and its hub would not be ruined but merely require a new bearing. In installing the bearing, it is desirable to pour the babbit into the hub around a suitable form and then apply pressure to the babbit while cooling and then machine the babbit to the proper tolerances after cooling.

If the bearing is made of two bronze bushings instead of the poured babbit 60, the joint or crack between the two bushings should be arranged close to the right hand end of the bearing, as viewed in Fig. 1, so as to have a one piece bushing along the high pressure area of the bearing, this being at the left, or directly under the car wheel 12, as viewed in Fig. 1.

From the foregoing it will be seen that the present invention provides a simple, inexpensive and trouble free bearing, particularly adapted for the car wheels of high speed railroad cars, in which the axle is floated on a constantly replenished film of oil and in which the oil is adequately sealed against escape or contamination so that the bearing will run without attention for a long period of time.

I claim as my invention:

1. A bearing assembly, comprising a non-rotating shaft having a cylindrical external bearing surface, and a rotatable coaxial hub having a cylindrical internal bearing surface coaxially and closely fitting said external bearing surface, said shaft being also formed internally to provide an oil reservoir within said external bearing surface, said external bearing surface being provided on opposite sides of a vertical plane passing through the axis of said shaft and in a horizontal plane adjacent the bottom of said reservoir with oil grooves extending lengthwise thereof, and said shaft being provided with generally horizontal oil ducts leading from the bottom of said reservoir to said oil grooves, the lower edge of each of said oil grooves being beveled to form with said internal bearing surface a V-shaped crevice diminishing downwardly and having an apex of sufficient fineness to cause a wedging of the oil molecules therein and said external surface also being provided along its summit with another groove and with another duct connecting said another groove with the top of said reservoir and through which gases and oil collecting in said another groove are returned to said reservoir.

2. A bearing assembly, comprising a non-rotating shaft having a cylindrical external bearing surface, a rotatable hub having a cylindrical internal bearing surface fitting said external bearing surface and extended at its opposite ends to provide thrust bearing surfaces, said shaft being internally formed to provide an oil reservoir within said external bearing surface, and a pair of thrust members operatively connected to said shaft and having thrust bearing surfaces engaging said first thrust bearing surfaces, said external cylindrical bearing surface being provided with an oil groove extending lengthwise thereof and arranged below a horizontal and to one side of a vertical plane passing through the axis of said shaft, and said shaft being provided with an oil duct leading from the bottom of said reservoir to said oil groove, and said external cylindrical bearing surface also being provided along the full length of its summit with another groove and with another duct connecting said another groove with said reservoir and through which gases and oil collecting in said another groove are returned to said reservoir, and said another groove communicating at its ends with radial oil grooves provided in the thrust bearing surfaces of said thrust members.

3. A bearing assembly, comprising a non-rotating shaft having a bore extending therethrough and forming an oil reservoir and having a cylindrical external bearing surface, a rotatable hub having a cylindrical internal bearing surface fitting said external bearing surface, said shaft being provided with a duct supplying oil from said reservoir to said bearing surfaces, a plug at each end of said bore, at least one of said plugs having a stem fitting in said bore and having an axial bore communicating therewith and an annular series of holes leading from said plug bore to an annular series of ports provided on the exterior of said stem, a filling tube fast to said shaft and communicating with one of said ports, and a vent tube fast to said shaft and communicating with another of said ports.

4. A bearing assembly, comprising a non-rotating shaft having a bore extending therethrough and forming an oil reservoir and having a cylindrical external bearing surface, a rotatable hub having a cylindrical internal bearing surface fitting said external bearing surface, said shaft being provided with a duct supplying oil from said reservoir to said bearing surfaces, a plug at each end of said bore, a bracket fast to one outer end of said shaft and rising therefrom, a filling tube rising from said one outer end of said shaft and housed within said bracket and communicating with said bore, and a vent tube rising from said one outer end of said shaft and housed within said bracket and communicating with said bore.

ALBERT F. HICKMAN.

REFERENCES CITED

The following references are of record in the file of this patent:

UNITED STATES PATENTS

| Number | Name | Date |
| --- | --- | --- |
| 414,021 | Cole | Oct. 29, 1889 |
| 1,003,864 | Avery | Sept. 9, 1911 |
| 1,277,993 | Morris | Sept. 3, 1918 |
| 1,505,552 | Garner | Aug. 19, 1924 |
| 1,959,697 | Tracy | May 22, 1934 |
| 2,080,670 | Nelson | May 18, 1937 |
| 2,080,744 | Rogers | May 18, 1937 |
| 2,179,875 | Baker | Nov. 14, 1939 |
| 2,266,175 | Delaval-Crow | Dec. 16, 1940 |

FOREIGN PATENTS

| Number | Country | Date |
| --- | --- | --- |
| 332,759 | France | Sept. 2, 1903 |
| 331,734 | Germany | Jan. 14, 1921 |
| 407,816 | Germany | Jan. 5, 1925 |
| 829,799 | France | Apr. 19, 1935 |